(12) United States Patent
Cousins

(10) Patent No.: US 7,002,261 B2
(45) Date of Patent: Feb. 21, 2006

(54) DOWNHOLE ELECTRICAL SUBMERSIBLE POWER GENERATOR

(75) Inventor: Edward Thomas Cousins, Richmond, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/832,108

(22) Filed: Apr. 26, 2004

(65) Prior Publication Data

US 2005/0012340 A1    Jan. 20, 2005

Related U.S. Application Data

(60) Provisional application No. 60/487,494, filed on Jul. 15, 2003.

(51) Int. Cl.
*E21B 4/04* (2006.01)
(52) U.S. Cl. .......................................... 290/54; 290/43
(58) Field of Classification Search ................. 290/54, 290/1 R, 43; 166/65.1
See application file for complete search history.

(56) References Cited

U.S. PATENT DOCUMENTS

| | | | | |
|---|---|---|---|---|
| 2,380,520 A | * | 7/1945 | Hassler | 367/83 |
| 4,132,269 A | * | 1/1979 | Chasteen | 166/268 |
| 4,491,738 A | * | 1/1985 | Kamp | 290/43 |
| 4,532,614 A | * | 7/1985 | Peppers | 367/81 |
| 5,248,896 A | * | 9/1993 | Forrest | 290/1 R |
| 5,285,204 A | * | 2/1994 | Sas-Jaworsky | 340/854.9 |
| 5,839,508 A | * | 11/1998 | Tubel et al. | 166/65.1 |
| 6,109,372 A | * | 8/2000 | Dorel et al. | 175/61 |
| 6,247,533 B1 | * | 6/2001 | Brett | 166/65.1 |
| 6,550,534 B1 | * | 4/2003 | Brett | 166/65.1 |
| 6,554,074 B1 | * | 4/2003 | Longbottom | 166/372 |
| 6,607,030 B1 | * | 8/2003 | Bauer et al. | 166/65.1 |
| 6,672,409 B1 | * | 1/2004 | Dock et al. | 175/107 |
| 6,802,379 B1 | * | 10/2004 | Dawson et al. | 175/38 |
| 6,848,503 B1 | * | 2/2005 | Schultz et al. | 166/66.5 |

* cited by examiner

*Primary Examiner*—Joseph Waks
(74) *Attorney, Agent, or Firm*—Osha Liang LLP

(57) ABSTRACT

A method and apparatus is described for a downhole submersible electrical power generator. The electrical power generator includes a housing forming a fluid conduit. An inlet is disposed on the housing. Also, an outlet is disposed on the housing where the inlet and the outlet are adapted to allow a fluid to flow into and out of the housing, respectively. A fluid flow powered electrical power generator is disposed inside the housing and is adapted to generate electrical power from the fluid flowing through the housing. An isolation packer is disposed outside the housing between the inlet and the outlet where the isolation packer is adapted to isolate the inlet and the outlet in different zones in a wellbore.

21 Claims, 5 Drawing Sheets

DOWNHOLE ELECTRICAL SUBMERSIBLE POWER GENERATOR

CROSS-REFERENCE TO RELATED APPLICATIONS

This application claims priority, pursuant to 35 U.S.C. § 119(e), of U.S. Provisional Patent Application No. 60/487,494 filed Jul. 15, 2003. That Application is incorporated by reference in its entirety.

BACKGROUND OF INVENTION

Electrical power is an important commodity in nearly all aspects of life. One such area where electrical power is important is in the hydrocarbon production arena. In particular, a number of large machines used in hydrocarbon production (pumps, etc.) require large amounts of electrical power. In many situations it is advantageous to be able to provide power locally, rather than having to lay power lines over vast distances. In particular, having to lay power lines may be problematic when the platform is offshore. As hydrocarbon production facilities move further and further away from land, this problem continues to grow in importance.

In addition, equipment used in the wellbore often requires a downhole electric power source for various operations. For example, a power source is required to operate circuits and instruments that measure the production capabilities of a well. In the prior art, batteries are typically used to provide the necessary power in a well.

However, a significant problem with the use of batteries as a power supply in a downhole environment is their limited life expectancy. The expected life of a battery is typically much shorter than in "standard" operating conditions due to harsh environmental factors. For example, the maximum temperature at which a battery performs reliably may be 200° C. Often, temperatures in the wellbore exceed this temperature. Further, caustic chemicals and fluids can cause early battery failure, causing delays and additional expense.

If a battery required by the downhole power source for the downhole instrument fails prior to the completion of testing, the testing string must be pulled back to the surface and the battery replaced or valuable rig time may be wasted on testing with no recorded data. This procedure causes an interruption in the collection of data as well as delay and further expense.

In addition, batteries can only provide a limited amount of power even when fully charged. This limits the use of circuits requiring higher power in a downhole environment.

For example, one operation which is often performed during the course of producing an oil or gas well is to lower a testing string into the wellbore to test the production capabilities of hydrocarbon producing underground formations intersected by the well. Testing is typically accomplished by lowering a string into the wellbore with an isolation packer attached to the string at its lower end. Once the test string is lowered to the desired final position, the isolation packer is set to seal off the annulus between the test string and the wellbore or casing, and small amounts of hydrocarbons are allowed to enter the test string. Measurements of pressure and temperature are then taken by transducers within the string, and the data is either stored in a memory, such as a random access memory (RAM) chip, within the testing circuit or transmitted to the surface. Depending on the data required for well test objectives, testing may last anywhere from one day to two weeks.

In another example, some production operations require the use of an electrical submersible pump (ESP). The ESP pumps downhole liquids and/or gases. The ESP requires a power source to operate. The ESP may receive power through an umbilical power cable connected to a surface power source. The amount of power provided by the umbilical power cable may be limited.

Accordingly, a need has arisen in the industry for a method and apparatus to extend the life of a downhole power source and/or increase the amount of power output from a downhole power source.

This disclosure incorporates by reference U.S. Pat. No. 5,149,984 and U.S. Pat. No. 5,965,964. In U.S. Pat. No. 5,149,984, a downhole electrical power supply apparatus uses a high fluid pressure source, such as a nitrogen chamber, to power a gas turbine. The rotational mechanical output of the gas turbine is converted to electrical power. The nitrogen chamber has a finite capacity with which to provide a high fluid pressure source to the gas turbine.

In U.S. Pat. No. 5,965,964, a piston is slidably attached to a sleeve and oscillates relative to the sleeve and a housing. The oscillation of the piston causes the oscillation of magnets relative to a wire coil section that generates electric power. Application of fluid pressure provided by drilling fluids during a drilling operation causes the piston to oscillate.

The above described current generator is available only during drilling operations. Accordingly, a method and apparatus for a downhole power source that is available during production and does not have a limited source of power is needed.

SUMMARY OF INVENTION

According to one aspect of one or more embodiments of the present invention, the present invention relates to a downhole submersible electrical power generator including a housing forming a fluid conduit; an inlet disposed on the housing; an outlet disposed on the housing, wherein the inlet and the outlet are adapted to allow a fluid to flow into and out of the housing, respectively, and wherein the fluid flows through the fluid conduit dependent on a naturally occurring hydraulic pressure differential; a fluid flow powered electrical power generator disposed inside the housing such that the fluid flow powered electrical power generator is adapted to generate electrical power from the fluid flowing into and out of the housing; and at least one isolation packer disposed outside the housing between the inlet and the outlet, wherein the at least one isolation packer is adapted to isolate the inlet and the outlet in different zones in a well.

According to one aspect of one or more embodiments of the present invention, the present invention relates to a method for generating electrical power using a downhole submersible electrical power generator including isolating a first wellbore zone from a second wellbore zone, wherein the first wellbore zone is at a higher hydraulic pressure than the second wellbore zone; flowing a fluid from the first wellbore zone to the second wellbore zone; and generating electrical power dependent on the flowing.

Other aspects and advantages of the invention will be apparent from the following description and the appended claims.

DETAILED DESCRIPTION

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In one aspect, the present invention relates to a method and apparatus for providing large amounts of electrical power that involve a downhole submersible electrical power generator. Embodiments of the present invention may be used to provide ½ Megwatt of power or more to local equipment on a rig site, or may be connected to a power grid, where the energy may be sold for a profit.

In particular, embodiments of the present invention may find particular utility in applications in the Gulf of Mexico, where a number of "watered out" wells exist. As used herein, "watered out" wells refer to wells which have been previously drilled, but now produce more water than oil or gas. Incorporation of the present invention into such wells may allow for the previously drilled wells (which may or may not be abandoned) to be used as mini "power stations." In particular, embodiments of the present invention may be used in any situation where a fluid pressure differential exists.

The above paragraphs provide exemplary descriptions of the usefulness of the present invention and are not intended to restrict the scope of the present invention in any way.

Embodiments of the present invention relate to a downhole submersible electrical power generator that includes a fluid flow powered electrical power generator disposed in a housing. The housing forms a fluid conduit and includes at least one inlet and at least one outlet. As arranged, fluid flows from the inlet, through the housing, to the outlet. In a preferred embodiment, fluid flows in dependence on a naturally occurring hydraulic pressure differential. The flow of the fluid powers the fluid flow powered electrical power generator, which may supply power to an apparatus.

Figure 1:
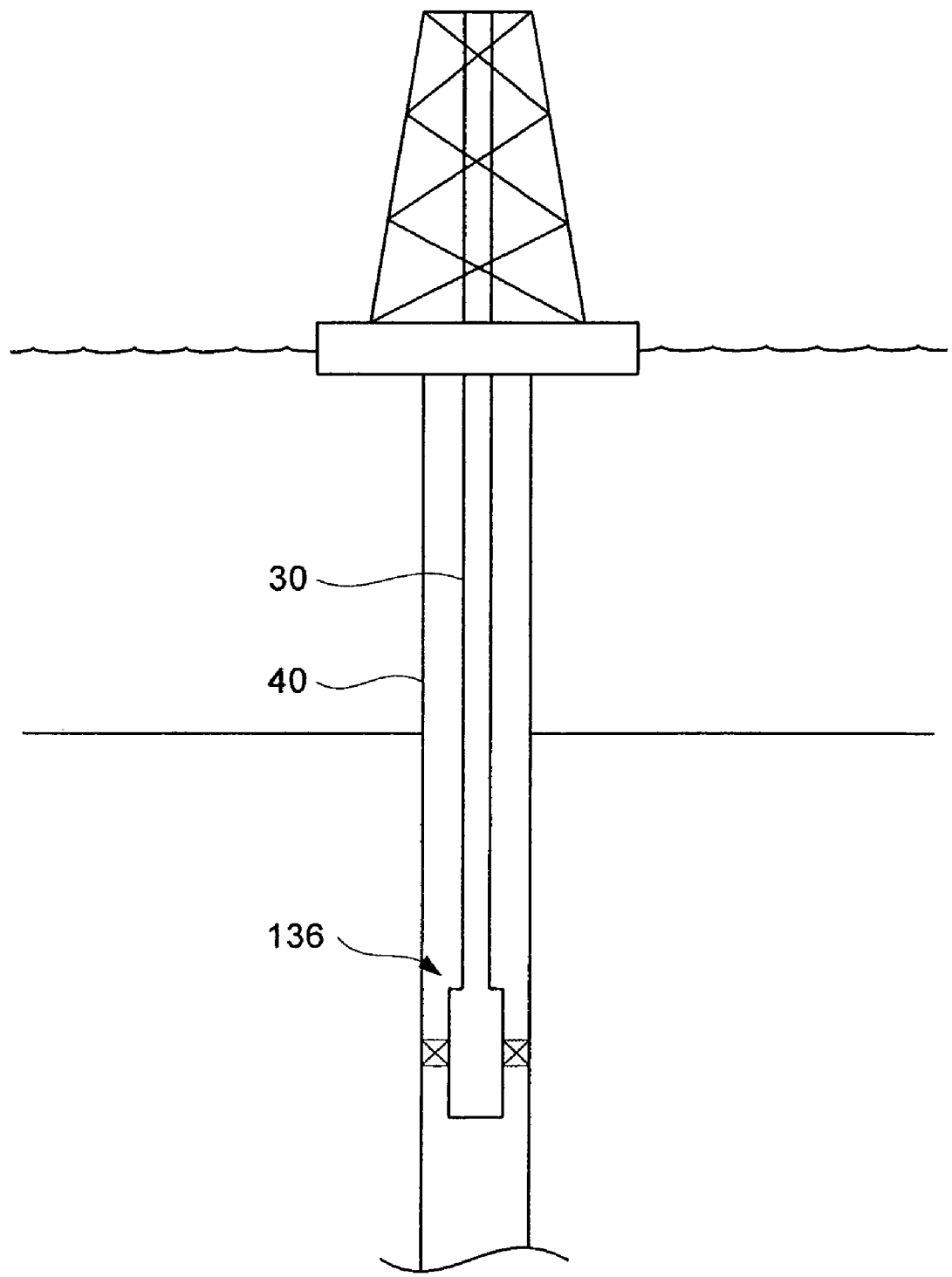
FIG. 1 illustrates a schematic of an offshore oil or gas production platform operating a downhole submersible electrical power generator in accordance with an embodiment of the present invention.

FIG. 1 illustrates a schematic of an exemplary offshore oil or gas production platform operating a downhole submersible electrical power generator (136) in accordance with an embodiment of the present invention. The downhole submersible electrical power generator (136) of the present invention may be used with a completion string (30), which is inserted into a wellbore (40), on an offshore rig. The downhole submersible electrical power generator (136) may also be incorporated into a probe that is inserted in the completion string (30), used with conventional offshore rigs. The downhole submersible electrical power generator (136) may be used as a stand-alone power supply for offshore and/or onshore operations. In addition, the downhole submersible electrical power generator (136) may be used in any number of well service operations, including formation testing.

Figure 2:
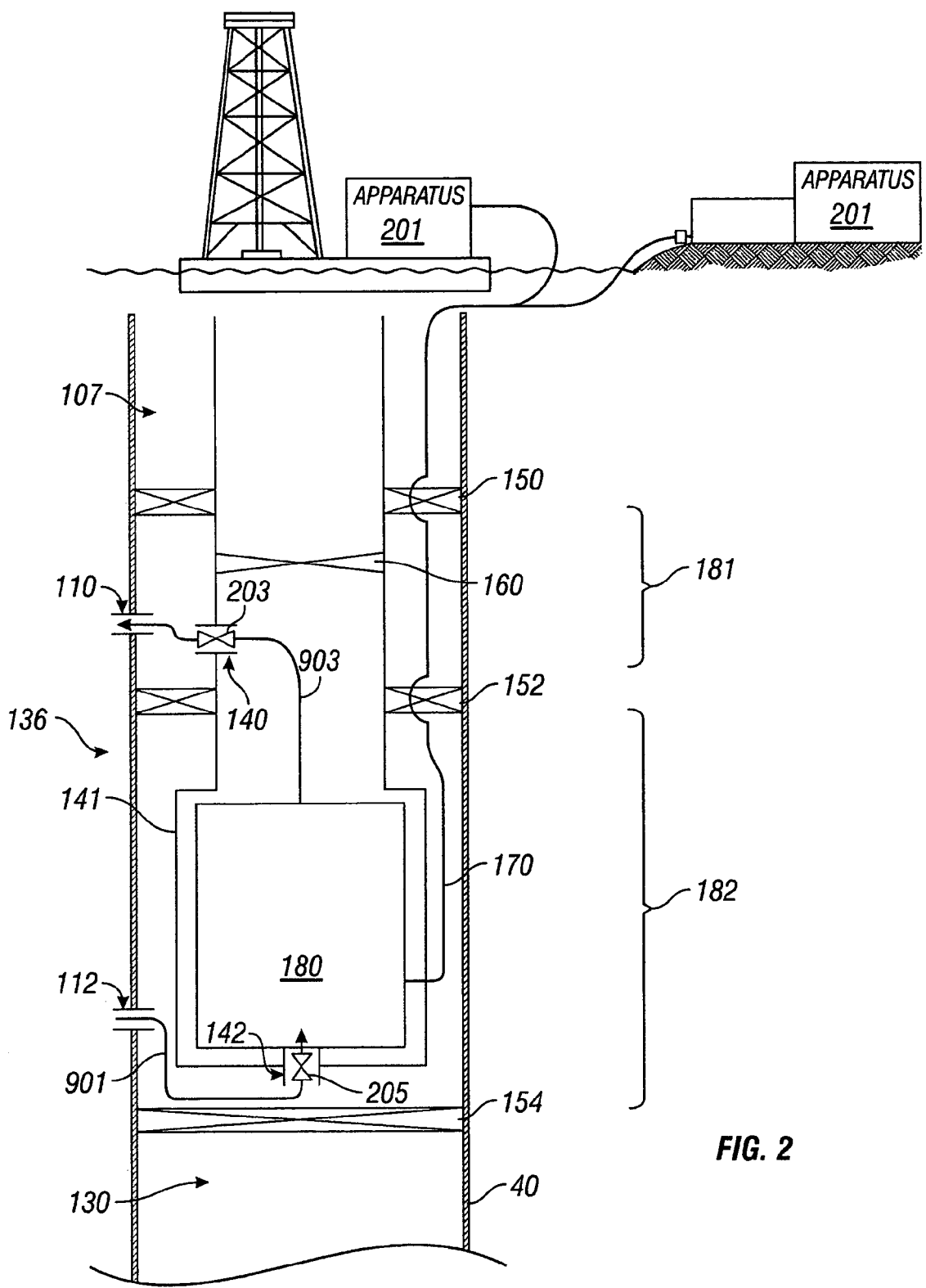
FIG. 2 illustrates a schematic of a downhole submersible electrical power generator in accordance with an embodiment of the present invention.

FIG. 2 illustrates a schematic of an exemplary downhole submersible electrical power generator (136) in accordance with an embodiment of the present invention. In one embodiment, the downhole submersible electrical power generator (136) is shown disposed in a wellbore (40). The wellbore (40) may be cased such that the walls of the wellbore (40) are supported by a hardened structure, e.g., steel and concrete. Furthermore, fluid permeable material may also be used between the casing and a formation exterior of the wellbore (40), e.g., gravel. Alternatively, the wellbore (40) may be unlined.

The downhole submersible electrical power generator (136) includes an inlet (142) and an outlet (140) disposed on a housing (141). The housing (141) forms a fluid conduit. A fluid is able to flow from the inlet (142) to the outlet (140) through the housing (141). A fluid flow powered electrical power generator (180) is disposed inside the housing (141). The fluid flow powered electrical power generator (180) is adapted to generate electrical power from the fluid flowing into and out of the housing (141). In this embodiment, the fluid flows through the housing (141) dependent on a naturally occurring hydraulic pressure differential.

As will be apparent to one of ordinary skill, a naturally occurring hydraulic pressure differential may occur from strata at different depths below a surface of the earth. For example, a naturally occurring hydraulic pressure differential may occur by locating a first perforation (112) in a wellbore (40) at a greater depth than a second perforation (110). Accordingly, a fluid from the first perforation (112) has a tendency to flow to the second perforation (110). The fluid may include, for example, water.

In this embodiment, the downhole submersible electrical power generator (136) includes at least one isolation packer (152) disposed outside the housing (141) between the inlet (142) and the outlet (140). The at least one isolation packer (152) is adapted to isolate the inlet (142) and the outlet (140) in different zones in the wellbore (40).

For example, in the embodiment shown, the at least one isolation packer (152) separates a first zone (182) of the wellbore (40) from a second zone (181) of the wellbore (40). The first zone (182) is deeper than the second zone (181) in the wellbore (40). Accordingly, first zone (182) may have a higher hydraulic pressure than the second zone (181).

Additional isolations packers may be used in accordance with an embodiment of the present invention. For example, isolation packer (154) may isolate the housing (141) from an abandoned zone (130). Also, isolation packer (150) may be used in accordance with an embodiment of the present invention to isolation the outlet (140) from a portion (107) of the wellbore (40).

By way of example and with reference to FIG. 2, a fluid may flow from the first perforation (112) along flow path (901). The fluid enters the inlet (142) into the housing (141). The fluid flow causes useful work in the fluid flow powered electrical power generator (180). After the fluid has passed through the fluid flow powered electrical power generator (180), the fluid continues along flow path (903) to the outlet (140). The fluid exits the outlet (140) to the second perforation (110).

Additionally, the housing (141) may include a valve (160) adapted to allow the fluid to flow from one portion of the housing (141) to another portion of the housing (141). The valve may divert some or all of the fluid from exiting the outlet (140).

The fluid flow powered electrical power generator (180) is adapted to generate electrical power, which may be transmitted via a power output cable (170) operatively connected to the fluid flow powered electrical power generator (180). The power output cable (170) operatively supplies power to an apparatus (201). The apparatus (201) may include elements located onshore, offshore, or both.

One of ordinary skill in the art having benefit of this disclosure understands that the inlet (142) and the outlet (140) allow passage of a fluid in and out of the housing, respectively. Accordingly, the inlet (142) and the outlet (140) may include, but are not limited to, an opening, a valve (205 and 203, respectively), a screen, a grating and/or a porthole.

Three different exemplary embodiments are described that may be included in the fluid flow powered electrical power generator (180) to convert fluid flow into energy. Specifically, the embodiments described include a rotor, a positive displacement rotor, and a hydraulically powered piston. Each of these embodiments may be operatively connected to an alternator section that generates power. One of ordinary skill in the art understands that an alternator section typically includes an alternator rotor and an alternator stator to generate electrical power. The rotor and alternator rotor should not be confused as similar elements. The positive displacement rotor may be used as the alternator rotor where the positive displacement rotor provides a means to convert hydraulic energy into mechanical energy. Moreover, while the present disclosure discloses a limited number of embodiments, one of ordinary skill will recognize that a number of other structures would function in a similar manner.

Figure 3:
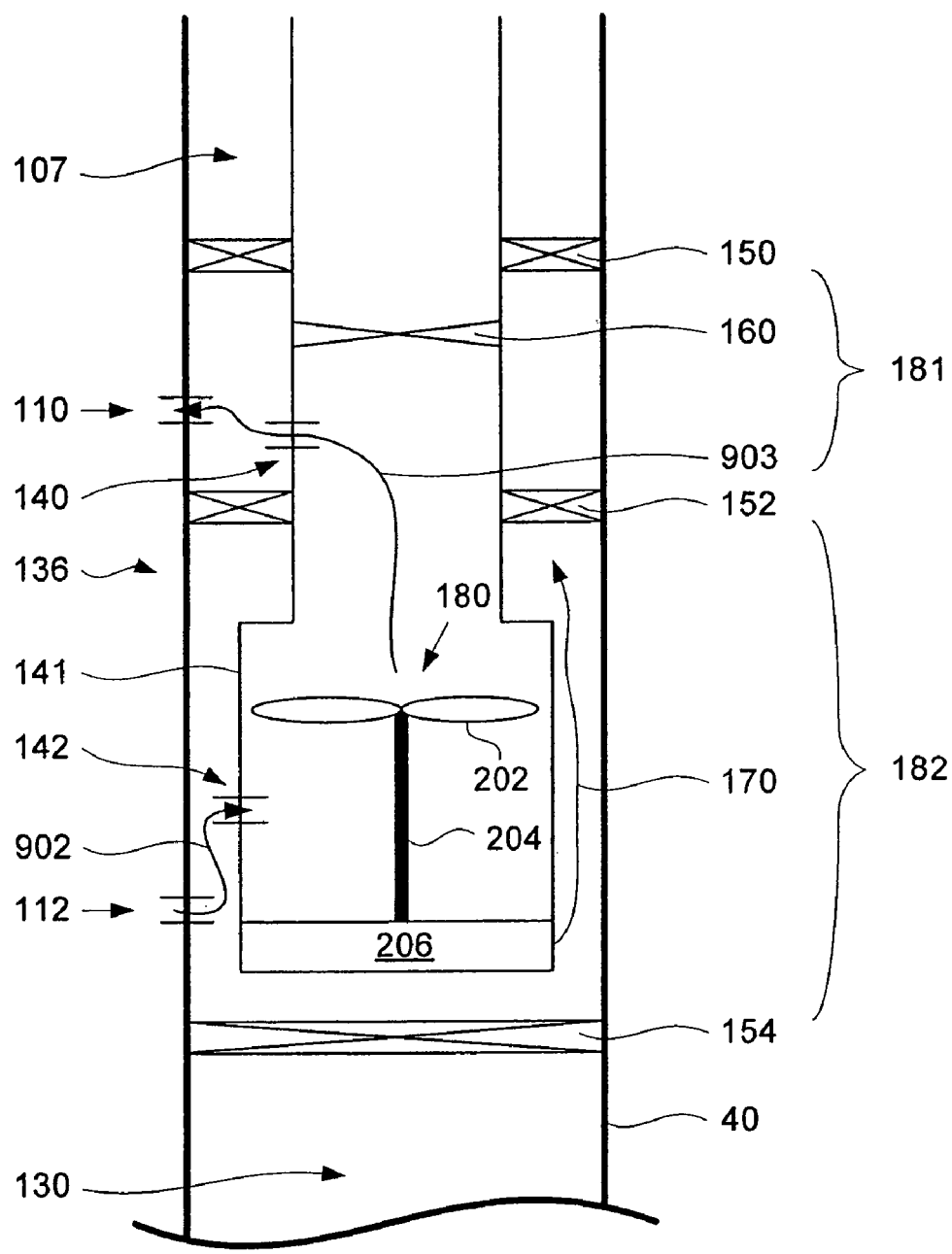
FIG. 3 illustrates a schematic of a downhole submersible electrical power generator using a rotor, shaft, and an alternator section in accordance with an embodiment of the present invention.

As noted above, a fluid flow powered electrical power generator in accordance with an embodiment of the present invention may comprise a rotor. FIG. 3 illustrates a schematic of an exemplary downhole submersible electrical power generator using a rotor (202), shaft (204), and an alternator section (206) in accordance with an embodiment of the present invention. Like numbered elements in FIG. 2 and FIG. 3 have similar functionality. The rotor (202) is operatively connected to the shaft (204), which drives the alternator section (206). A fluid may flow from the first perforation (112) along flow path (902) through the housing (141) to rotate the rotor (202). Rotation of the rotor (202) is transmitted through the shaft (204) to the alternator section (206).

One of ordinary skill in the art having benefit of this disclosure understands that the rotor may have a variety of different shapes and/or designs. A simple propeller blade rotor may serve as an example. As the fluid flows across or through the rotor (202), the shape of the rotor causes the flow to be vectored from the fluid flow's original flow path. The vectored fluid flow exerts a force on the rotor (202). The force, in turn, creates a rotational motion.

The rotational motion is transmitted through the shaft (204) to an alternator section (206). One of ordinary skill in the art understands that an alternator section may include an alternator rotor and an alternator stator.

The alternator rotor may include magnets, while the alternator stator may include coil wires. As the alternator rotor rotates, magnets in the alternator rotor repeatedly cross over coil wires located in the alternator stator. The movement of the magnets with respect to the coil wires creates a changing magnetic flux across the coil wires. As a result, an alternating current is generated within the coil wires. The alternating current generated by the alternator section (206) may be converted to DC current with an AC/DC converter, if necessary.

Figure 4:
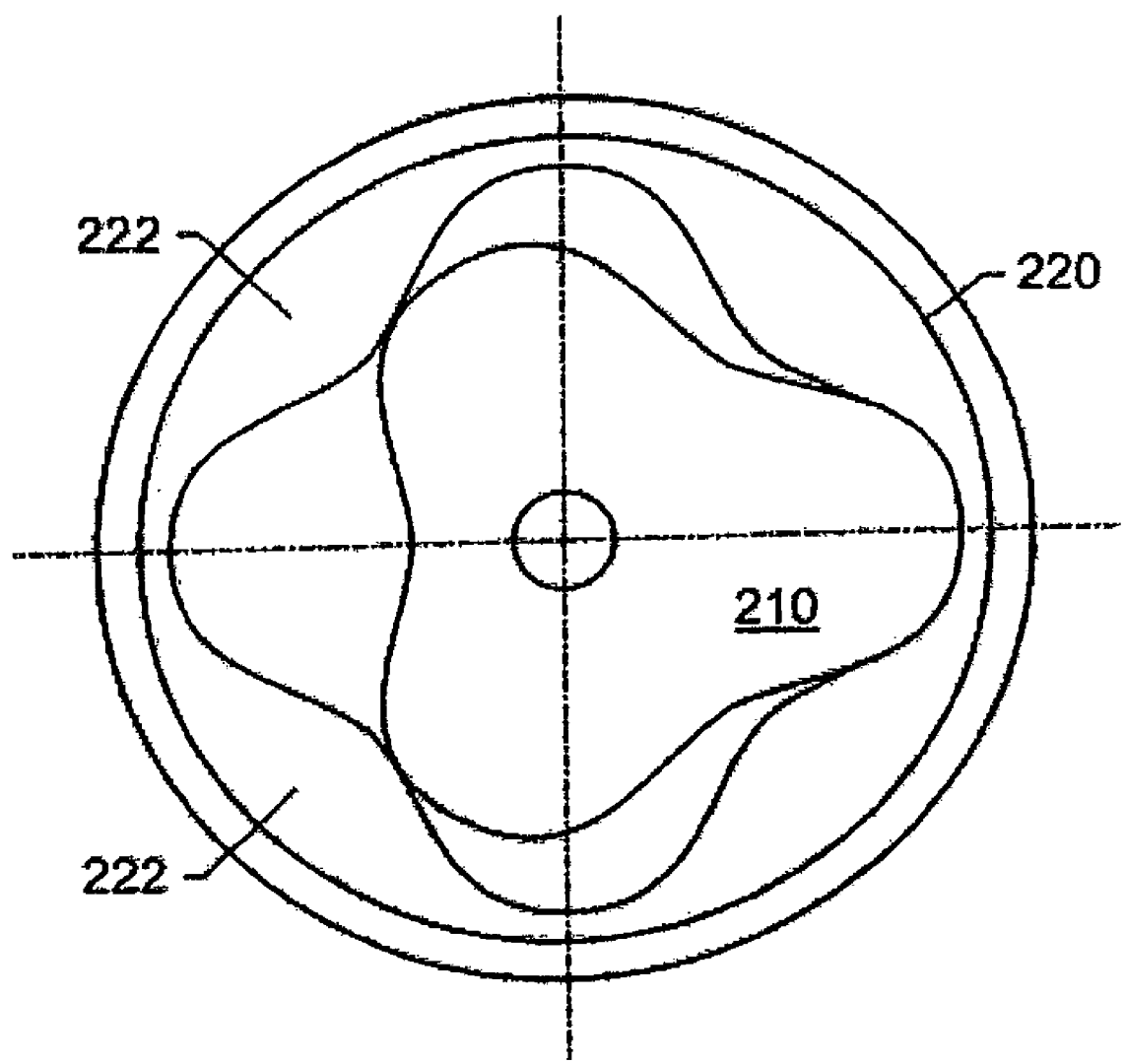
FIG. 4 illustrates a cross-sectional view of a positive displacement, fluid flow powered electrical power generator in accordance with an embodiment of the present invention.

As noted above, a fluid flow powered electrical power generator may use a positive displacement generator (Moineau motor) to capture the energy from the flowing fluid. FIG. 4 illustrates a cross-sectional view of an exemplary assembled positive displacement, fluid flow powered electrical power generator in accordance with an embodiment of the present invention. A positive displacement, fluid flow powered electrical power generator operates according to a mechanical application of the Moineau principle, wherein pressurized fluid is forced though helical channels formed between a positive displacement rotor (210) and a positive displacement stator (220) to generate rotational motion of the positive displacement rotor (210). This rotational motion may be converted, directly or indirectly, into electrical power.

The positive displacement rotor (210) shown in FIG. 4 may be coupled either directly or indirectly to, for example, an inlet (142) shown in FIG. 4. In this manner, the positive displacement, fluid flow powered electrical power generator produces electrical power directly from the flow of fluid. The positive displacement rotor (210) may include magnets, while the positive displacement stator (220) may include coil wires. As the positive displacement rotor (210) rotates, magnets in the positive displacement rotor (210) repeatedly cross over coil wires located in the positive displacement stator (220). The movement of the magnets with respect to the coil wires creates a changing magnetic flux across the coil wires. As a result, an alternating current is generated within the coil wires. The alternating current generated by the positive displacement, fluid flow powered electrical power generator may be converted to DC current with an AC/DC converter, if necessary. In an alternate embodiment, the positive displacement rotor (210) and the positive displacement stator (220) do not include magnets or coil wires. Instead, the positive displacement rotor (210) may be operatively connected to a separate alternator section.

A rotational frequency and, for example, an amount of torque generated by the rotation of the positive displacement rotor (210) within the positive displacement stator (220) may be selected by determining a number of lobes (222) on the positive displacement rotor (210) and the positive displacement stator (220), a major and minor diameter of the positive displacement rotor (210) and the positive displacement stator (220), and the like.

In one or more embodiments of the invention, a fluid flow powered electrical power generator may use a turbine to capture the energy from the flowing fluid. A turbine may include one or more turbine rotors mounted on a shaft. A turbine rotor is generally constructed with curved blades. Pressurized fluid is forced between the curved blades of the turbine rotor causing rotational motion of the turbine rotor. As in other disclosed embodiments, the rotational motion may be used to generate electrical power directly or indirectly. As is known in the art, the properties of the turbine rotor (e.g., blade length, curvature, and quantity) may be varied to generate power in a manner suitable to a particular application.

Figure 5:
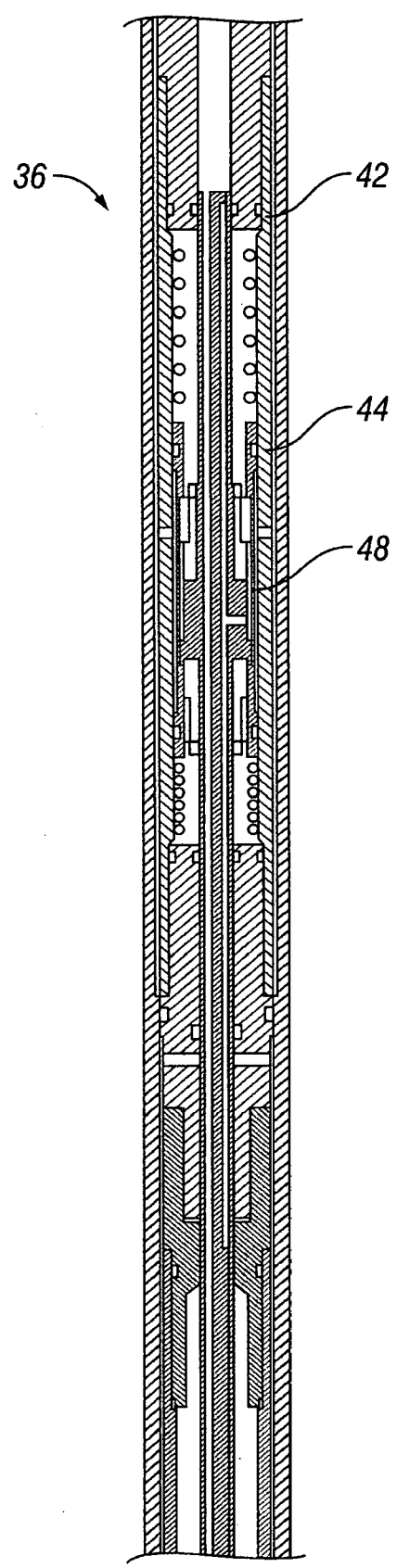
FIG. 5 illustrates a Prior Art power generator.

Some embodiments of the invention may use a piston-like mechanism for power generation. Any piston mechanism that uses fluid flow to generate repetitive motions may be coupled to magnet-coil assemblies to produce electric currents. One example of these can be found in U.S. Pat. No. 5,965,964, which is incorporated herein in its entirety. A power section (36) of an electrical power generator disclosed by the '964 Patent is shown in FIG. 5. The power section (36) includes the housing (42), and the piston (48) slidably disposed within sleeve (44) and housing (42).

Advantages of the present invention may include one or more of the following. In one or more embodiments, fluid flow is converted into mechanical energy using embodiments that include a rotor, a positive displacement, fluid flow powered electrical power generator, or a piston. The mechanical energy is converted into electrical power by an alternator section. The fluid flow may be dependent on any naturally occurring fluid flow, including a fluid flow caused by a hydraulic pressure differential. Accordingly, the electrical power is readily available and may not require an external energy source (e.g., combustible fuel, pressurized gas, operations from a pump or drilling rig, etc.).

In one or more embodiments, a current generated by an alternator section may be stored in a battery or used to supplement the power of batteries in a downhole power source. The additional current generated by the alternator section can increase the power output to operate circuits requiring higher power. By supplementing the electrical power provided by the downhole battery, the present invention enables the use of circuits, sensors, instruments on control valves, etc., requiring higher power than what could previously be provided by downhole batteries.

In one or more embodiments, the current generated by an alternator section may be used to temporarily replace a battery as a downhole power source. By allowing less use of the battery, the present invention increases the life of downhole batteries. In addition, the invention may be used to recharge rechargeable downhole batteries.

In one or more embodiments, the alternator section has an efficient design which may be implemented without much cost.

In one or more embodiments, the downhole submersible electrical power generator has no battery imposed temperature limitations and thus it may be used in environments having increased operating temperatures.

Advantageously, embodiments of the present invention provide a power generator capable of producing electricity on the order of ½ megawatt. Accordingly, embodiments of the present invention disclose a method and apparatus for supplying power to sea floor mounted pumps that would pump oil and water into a pipeline. Further, embodiments of the present invention can generate power from geo-pressured reservoirs that no longer produce oil but have "watered out" or now produce water at 95% to 99% and a small amount of oil. These wells can still be valuable as energy sources or mini hydro-electric plants.

Moreover, it should be noted that the "drive fluid" can be water, oil, gas, or a combination. Any fluid can drive the wheel as long as a pressure differential exists.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A downhole submersible electrical power generator, comprising:
    a housing forming a fluid conduit;
    an inlet disposed on the housing;
    an outlet disposed on the housing, wherein the inlet and the outlet are adapted to allow a fluid to flow into and out of the housing, respectively;
    a fluid flow powered electrical power generator disposed inside the housing and adapted to generate electrical power from the fluid flowing through the housing;
    a first isolation packer disposed outside the housing between the inlet and the outlet, wherein the first isolation packer is adapted to isolate the inlet and the outlet in different zones in a wellbore; and
    a second isolation packer disposed outside the housing, wherein the second isolation packer is adapted to isolate the outlet from a portion of the well,
    wherein the inlet is disposed in a first zone, wherein the outlet is disposed in a second zone, and wherein the first zone is at a greater depth than the second zone.

2. The downhole submersible electrical power generator of claim 1, wherein the fluid flows through the fluid conduit dependent on a naturally occurring hydraulic pressure differential.

3. The downhole submersible electrical power generator of claim 1, wherein the fluid comprises water.

4. The downhole submersible electrical power generator of claim 1, wherein the fluid flow powered electrical generator comprises a rotor.

5. The downhole submersible electrical power generator of claim 1, wherein the fluid flow powered electrical generator comprises a piston.

6. The downhole submersible electrical power generator of claim 1, wherein the fluid flow powered electrical generator comprises a positive displacement rotor.

7. The downhole submersible electrical power generator of claim 1, wherein the fluid flow powered electrical generator comprises a turbine rotor.

8. The downhole submersible electrical power generator of claim 1, wherein the fluid flow powered electrical generator comprises an alternator section.

9. The downhole submersible electrical power generator of claim 1, further comprising:
    a power output cable operatively connected to the fluid flow powered electrical power generator, wherein the power output cable operatively supplies power to an apparatus.

10. The downhole submersible electrical power generator of claim 9, wherein the apparatus comprises elements located onshore.

11. The downhole submersible electrical power generator of claim 1, wherein the wellbore is cased, and wherein the at least one isolation packer is adapted to form a seal with the cased wellbore.

12. The downhole submersible electrical power generator of claim 1, wherein the inlet comprises a valve.

13. The downhole submersible electrical power generator of claim 1, wherein the outlet comprises a valve.

14. The downhole submersible electrical power generator of claim 1, wherein the housing comprises a valve adapted to allow the fluid to flow from one portion of the housing to another portion of the housing.

15. A method for generating electrical power using a downhole submersible electrical power generator, comprising:
    disposing the downhole submersible electrical power generator in a borehole;
    isolating a first wellbore zone from a second wellbore zone using an isolation packer disposed outside the downhole submersible electrical power generator, wherein the first wellbore zone is at a higher hydraulic pressure than the second wellbore zone, wherein the first wellbore zone comprises a first perforation and the second wellbore zone comprises a second perforation; flowing a fluid from the first wellbore zone to the second wellbore zone through a fluid path included in the downhole submersible electrical power generator; and generating electrical power dependent on the flowing, wherein the first wellbore zone is at a greater depth than the second wellbore zone.

16. The method for generating electrical power of claim 15, further comprising:
transmitting the electrical power to an apparatus.

17. The method for generating electrical power of claim 16, wherein the transmitting is to an onshore location.

18. The method for generating electrical power of claim 15, wherein the fluid comprises water.

19. The method for generating electrical power of claim 15, wherein the first welibore zone is at a greater depth than the second wellbore zone.

20. The method for generating electrical power of claim 15, wherein the generating comprises using an alternator section.

21. The method for generating electrical power of claim 15, wherein the generating is dependent on rotating a rotor.

* * * * *

UNITED STATES PATENT AND TRADEMARK OFFICE
CERTIFICATE OF CORRECTION

PATENT NO. : 7,002,261 B2  Page 1 of 1
DATED : February 21, 2006
INVENTOR(S) : Edward Thomas Cousins It is certified that error appears in the above-identified patent and that said Letters Patent is hereby corrected as shown below:

<u>Column 4,</u>
Line 42, delete "The".
Line 42, delete "at" and insert -- At --.

Signed and Sealed this

Sixteenth Day of May, 2006

JON W. DUDAS
*Director of the United States Patent and Trademark Office*